July 17, 1956  A. BOSCHI  2,754,667
UNIVERSAL JOINTS

Filed Dec. 1, 1953  2 Sheets-Sheet 1

INVENTOR.
ANTONIO BOSCHI.

BY *Stone, Boyden & Mack*
ATTORNEYS.

July 17, 1956   A. BOSCHI   2,754,667
UNIVERSAL JOINTS

Filed Dec. 1, 1953   2 Sheets-Sheet 2

INVENTOR.
ANTONIO BOSCHI

BY *Stone, Boyden & Mack*
ATTORNEYS

United States Patent Office 2,754,667
Patented July 17, 1956

2,754,667

UNIVERSAL JOINTS

Antonio Boschi, Milan, Italy, assignor to Societa Applicazioni Gomma Antivibranti S. A. G. A. Societa per Azioni, Milan, Italy Application December 1, 1953, Serial No. 395,570

4 Claims. (Cl. 64—11)

This invention pertains to universal joints for providing angular flexibility between the driving and driven members thereby connected, and more particularly has reference to means for flexibly connecting said members, so as to provide flexibility in torsional, conical (cardanic) and axial directions.

The type of universal joint to which my invention is particularly applicable is one in which there is keyed, to the driving shaft, and to the driven shaft, an identical spider member, each having a plurality of radial arms which are arranged alternately in a common path of rotation, so that each arm of one spider member is disposed between an adjacent pan of arms of the other spider member. Since the details of construction of said spider members form no part of my invention, no further description thereof is required.

The principal objects of this invention are to provide simple and inexpensive means for flexibly connecting the spider members of a universal joint in such manner as to provide a considerable degree of flexibility in three direction, viz: (1) torsional (i. e. in the path of rotation of the joint), (2) conical (cardanic), where the driving and driven shafts are angularly disposed with reference to the respective axes of rotation; and (3) axial (i. e. parallel to the axes of rotation of the driving and driven shafts).

With these and other objects in view which may be incident to my improvements, my invention consists in the combination and arrangement of elements hereinafter described and illustrated in the accompanying drawings, in which.

The same reference numerals indicate corresponding parts in each figure of the drawings.

Figure 1:
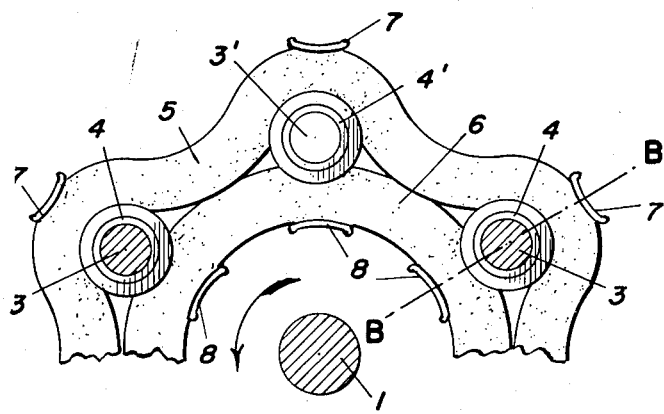
Fig. 1 is a partial front elevation of a flexible connection between the spider members of a universal joint, embodying one form of my invention, as viewed from line A—A of Fig. 2.
Figure 2:
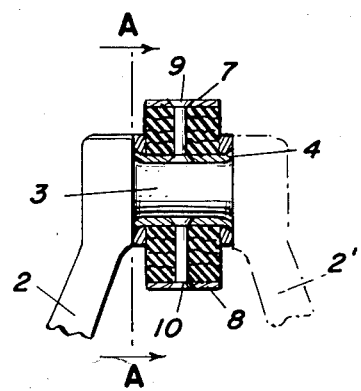
Fig. 2 is a diametral section of one of the flexible connections, along the line B—B of Fig. 1.

Referring first to Figs. 1 and 2 of the drawings, the reference numeral 1 denotes a driving shaft (shown in section) to which is keyed a spider (not shown) having a plurality of radial arms 2, each carrying at its outer end an integral journal 3 extending axially of the universal joint. A similar spider, keyed to the driven shaft (not shown) has its radial arms 2' so arranged that their journals 3' are in the path of rotation and spaced between each adjacent pair of journals 3, on arms 2 of the driving spider. Rotatably mounted on each journal 3 and 3' is a sleeve 4 and 4' to which are attached flexible annular members 5 and 6, each comprising a belt consisting of a plurality of superimposed strips of flexible material (i. e. rubberized cloth) of suitable thickness and strength. Members 5 and 6 are secured to sleeves 4 and 4' by curved, metal clamping plates 7 and 8, and rivets 9 and 10 which pass through said plates, strips and sleeves, as shown in Fig. 2. It will thus be seen that the journals constitute means for connecting the annular flexible members 5 and 6 to the driving and driven spiders, and that the rivets 9 and 10 and metal clamping plates 7 and 8 form means for anchoring the flexible members to the journals. Thus, the combination of journals 3, 3' and flexible members 5 and 6 constitutes an annular assemblage for transmitting torsional moments between the driving and driven spiders.

Assuming that the driving shaft 1 is rotating in the direction indicated by the arrow in Fig. 1, the torque of said shaft is transmitted to the driven shaft through arms 2 and journals 3 of shaft 1, connecting members 5 and 6, and arms 2' and journals 3' of the driven shaft. In transmitting said torque, alternate portions of the connecting members 5 and 6 are stressed in tension and compression, respectively. Thus, in Fig. 1, the segment or portion of members 5 and 6 between journal 3 to the left of journal 3' are stressed in tension, and the segment or portion of members 5 and 6 to the right of journal 3' are stressed in compression. The left portion of members 5 and 6 thus stressed in tension will tend to straighten or flatten out, while the right portion of said members stressed in compression will tend to bend further inwardly and outwardly, respectively, but since such bending is reciprocally opposed by the opposite radial thrusts of members 5 and 6, they will remain in the same position relative to shaft 1, even under maximum load. The straightening of the left portions and the bending of the right portions of members 5 and 6, permits some relative movement between journals 3 and 3' in the path of their rotation which a certain torsional flexibility of the joint. At the same time, the freedom of members 5 and 6 to bend laterally assures sufficient conical (cardanic) and axial flexibility of the joints. The ratio of torsional to conical (cardanic) and axial flexibility of the joint is determined by the relative dimensions of the rectangular cross-sections of members 5 and 6, in which (as shown in Fig. 2) the width slightly exceeds the thickness.

Figure 3:
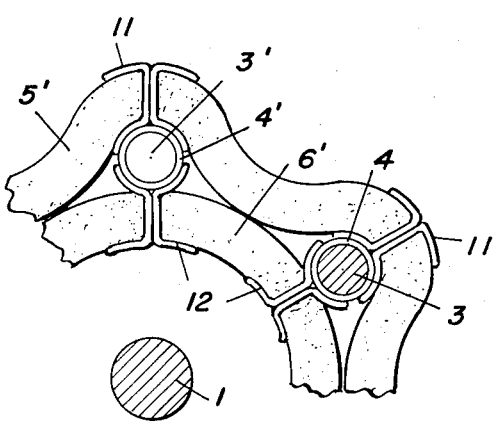
Fig. 3 is a view, similar to Fig. 1, of a modified form of the flexible connection shown in Fig. 1.

In Fig. 3 is shown a modification of the connecting members 5 and 6 of Fig. 1 in which each of said members is divided into a plurality of arcuate sectors 5' and 6', each of which is provided at each end with a shoe 11 and 12, respectively. Each abutting pair of shoes 11 and 12 serves to fasten members 5' and 6' to sleeves 4 and 4'. Each sector 5 and 6' may consist of a plurality of separate belts, as shown in Fig. 3, or each sector may consist of a single belt of rubber or suitable, flexible plastic molded to the same composite shape, with inserted textile or metallic reinforcements. In Fig. 3 as in Fig. 1, the opposed portions of the members 5 and 6 have their convex surfaces in contact with each other.

In view of the joint between sectors 5' and 6' shown in Fig. 3, said sectors, in modified form, may be fastened together and attached to arms 2 and 2' by other forms of joints comprising metallic parts corresponding to the requirements for the assembling and working of the joint itself.

Figure 4:
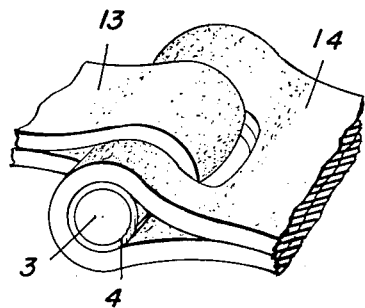
Fig. 4 is an isometric view of another modification of one of the flexible connections shown in Fig. 1.

Thus, Fig. 4 shows a hinged joint between members 13 and 14, each of which replaces a pair of sectors 5' and 6' of Fig. 3. Each end of members 13 and 14 terminates in a loop which encircles a sleeve 4 (or 4'); the ends of member 14 being bifurcated so as to bestride the adjacent end of member 13. This type of joint is particularly suitable where the ends of the connecting members 13 and 14 are fastened to sleeves 4. Where it is desired to have the connecting members (such as 13 and 14 of Fig. 4) readily detachable from sleeves 4, and of the same configuration, so as to be interchangeable, any of the forms of joints shown in Figs. 5, 6, 7, 8 and 9 may be substituted for the joint of Fig. 4.

Figure 5:
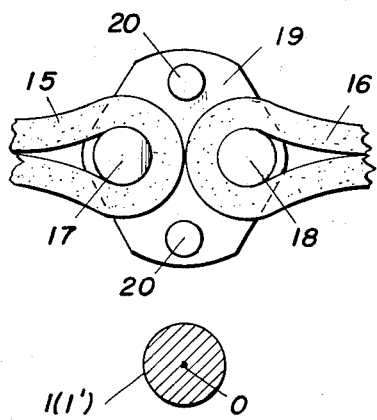
Figs. 5, 6, 7 and 8 are front elevations of other modified forms of one of the flexible connections shown in Fig. 1.

In the form of joint shown in Fig. 5, the connecting members 15 and 16, which are identical, terminate in looped ends wherein are inserted studs 17 and 18, fixedly attached alternately to the outer end of an arm 2 or 2', by a pair of pins 20, that replace the journals 3 (or 3') of Figs. 1 and 2. Pins 20 prevent the rotation of the joint between connecting members 17 and 18, with respect to the center of rotation O of shaft 1 (or 1').

Figure 6:
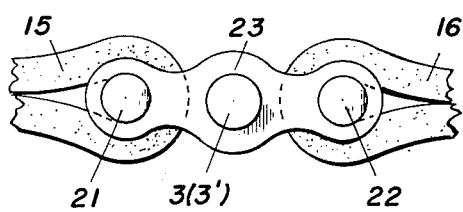

The joint in Fig. 6 is similar to that of Fig. 5, except that the looped ends of members 15 and 16 are engaged by pins 21 and 22, journalled in the ends of a link 3, which is rotatably mounted alternately on a journal 3 (or 3').

Figure 7:
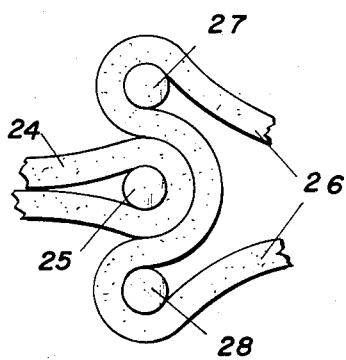

In Fig. 7, each end of one connecting member 24 is looped over a pin 25, while each end of the other connecting member 26 is looped over a pair of pins 27 and 28. Pins 25, 26 and 27 may be attached to arms 2 or 2' by means of a fixed plate, as in Fig. 5, or by a rotatable link, as in Fig. 6.

Figure 8:
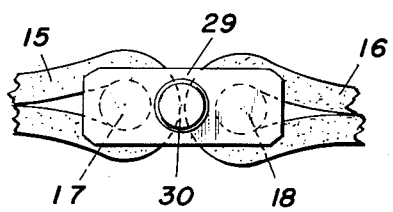
Figure 9:
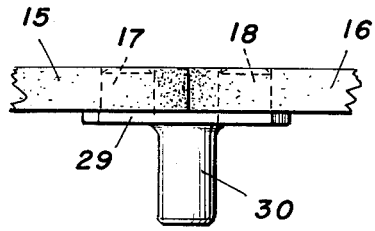
Fig. 9 is a plan view of the connection shown in Fig. 8.

In the form of joint shown in Figs. 8 and 9 is similar to that of Fig. 5, except that the pins 17 and 18 which engage the looped ends of members 15 and 16 are carried by a plate 29 having an integral, projecting sleeve which is rotably mounted, alternately on a journal 3 or 3', in the same manner as sleeves 4 and 4' in Figs. 1 and 2.

While I have shown and described the preferred embodiments of my invention, I desire it to be understood that I do not limit myself to the precise details of construction disclosed by way of illustration, as these can be changed and modified by those skilled in the art, without departing from the spirit of my invention nor exceeding the scope of the addended claims.

I claim:

1. In a universal joint for transmitting torsional moments from a driving shaft to a driven shaft, the combination of a driving member for attachment to the driving shaft, a driven member for attachment to the driven shaft, each of said members being provided with a plurality of connector means fixed thereto, said connector means being circumferentially spaced about the axis of the universal joint with the connector means of one member alternately disposed with respect to the connector means of the other member, said connector means combining to form an annular series, and flexible means anchored to said connector means and constituting with said connector means and annular assemblage for transmitting torsional moments between said driving and driven members, said flexible means including in its length a plurality of primary portions each bridging adjacent ones of said connector means, each primary portion including a pair of secondary arcuate oppositely disposed portions, said arcuate oppositely disposed portions being positioned with their convex surfaces contacting each other whereby said arcuate oppositely disposed portions oppose each other when the primary portions are subjected to compression during operation of the universal joint.

2. In a universal joint for transmitting torsional moments from a driving shaft to a driven shaft, the combination of a driving member for attachment to the driving shaft, a driven member for attachment to the driven shaft, each of said members being provided with a plurality of axially extending elements fixed thereto, said elements being circumferentially spaced with respect to the axis of the universal joint with the elements of one member alternately disposed with respect to the elements of the other member, said elements combining to form an annular series, a continuous flexible annular member surrounding said series and anchored to each element thereof, and a continuous flexible annular member disposed within said series and anchored to each element thereof, at least one of said annular members having a hill-and-valley configuration with the high portion of each hill embracing one of said elements and the low portion of each valley contacting the other of said annular members adjacent ones of said elements.

3. In a universal joint for transmitting torsional moments from a driving shaft to a driven shaft, the combination of a first annular flexible member, a plurality of elements extending axially of said flexible member, and spaced about the periphery thereof to form an annular series, a second annular flexible member enclosing said series, portions of said second annular member between adjacent ones of said elements curving inwardly into contact with the periphery of said first annular member, said annular members being attached to said elements, a driving member for attachment to the driving shaft, and a driven member for attachment to the driven shaft, said elements being secured alternately to said driving and driven members.

4. A universal joint as defined in claim 1, in which the arcuate oppositely disposed portions are separate segments of the respective annular series, and have means securing each end of each of said separate segments to a different one of said separate segments, whereby said segments constitute an annular flexible assemblage interconnecting said driving and driven members.

References Cited in the file of this patent

UNITED STATES PATENTS 1,316,903   Kuentzel _____ Sept. 23, 1919